United States Patent
Ballabriga et al.

(10) Patent No.: US 8,502,155 B2
(45) Date of Patent: Aug. 6, 2013

(54) PIXILATED RADIATION SENSING DEVICE

(75) Inventors: Rafael Ballabriga, Thoiry (FR);
Michael Campbell, Geneva (CH);
Henrious M. Heijne, Meyrin (CH);
Xavier Llopart-Cudie, Sergy (FR);
Richard Plackett, Marlioz (FR); Lukas Tlustos, Geneva (CH); Winnie Sze-Wing Wong, Geneva (CH)

(73) Assignee: Organisation Europeenne pour la Recherche Nucleaire, Geneva (CH)

( * ) Notice: Subject to any disclaimer, the term of this patent is extended or adjusted under 35 U.S.C. 154(b) by 15 days.

(21) Appl. No.: 13/388,647

(22) PCT Filed: Aug. 4, 2009

(86) PCT No.: PCT/EP2009/060115
§ 371 (c)(1),
(2), (4) Date: Feb. 2, 2012

(87) PCT Pub. No.: WO2011/015235
PCT Pub. Date: Feb. 10, 2011

(65) Prior Publication Data
US 2012/0126131 A1    May 24, 2012

(51) Int. Cl.
*H01L 27/146*    (2006.01)

(52) U.S. Cl.
USPC ............................................. 250/370.08

(58) Field of Classification Search
USPC ................ 250/370.01–370.15; 378/98.8
See application file for complete search history.

(56) References Cited

U.S. PATENT DOCUMENTS

| 5,651,047 | A  | * | 7/1997 | Moorman et al. | 378/98.8 |
| 6,242,745 | B1 | * | 6/2001 | Berlad et al. | 250/370.1 |
| 7,145,985 | B2 | * | 12/2006 | Strommer | 378/98.8 |
| 2003/0164442 | A1 | | 9/2003 | Beusch | |

FOREIGN PATENT DOCUMENTS

WO    WO 2007/038974 A1    4/2007

OTHER PUBLICATIONS

Edling et al., "Performance of a pixel readout chip with two counters for x-ray imaging," 2003, IEEE Nuclear Science Symposium Conference Record, vol. 1, pp. 29-32.*
International Search Report for PCT/EP2009/060115 (filed Aug. 4, 2009), mailed Jul. 13, 2010, 3 pgs.
Written Opinion of the International Search Report for PCT/EP2009/060115 (filed Aug. 4, 2009), mailed Jul. 13, 2010, 5 pgs.

* cited by examiner

*Primary Examiner* — Kiho Kim
(74) *Attorney, Agent, or Firm* — Patterson Thuente Pedersen, P.A.

(57) ABSTRACT

A radiation sensing device subdivided in N*M pixels, comprising: a conversion part to convert an impinging radiation into an electrical signal, a processing part having: for each pixel, at least two counters associated to different regions, so that a ratio of counters to pixels is at least equal to 2, an arbitration circuit which, for each pixel: receives detection information from the pixel and neighbouring pixels, taking into account detection information for the pixel and neighbouring pixels, allocates a detection value to an elected counter.

20 Claims, 8 Drawing Sheets

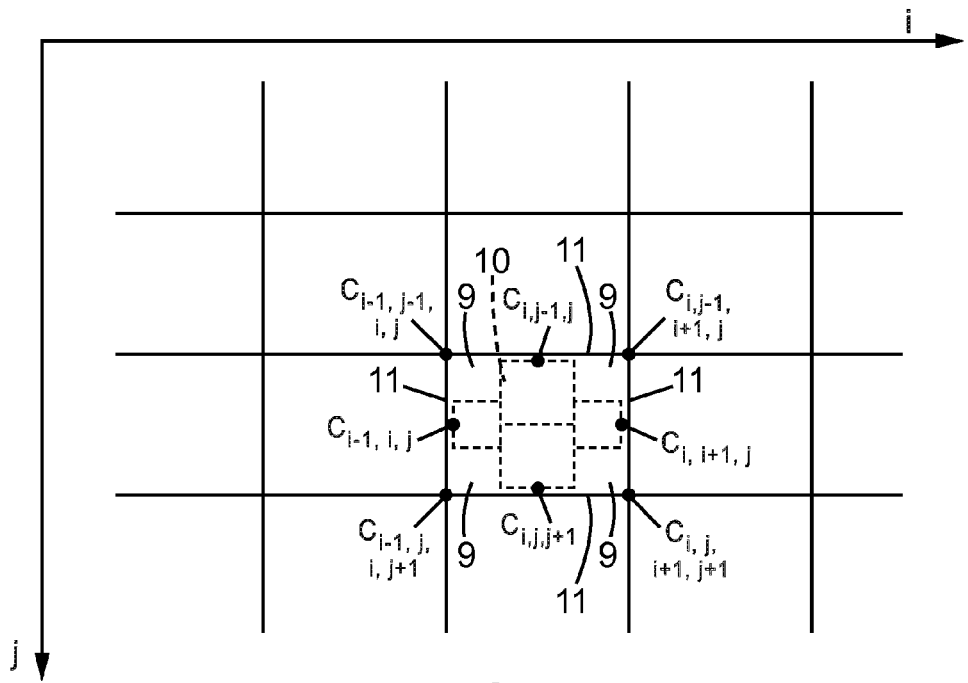
FIG. 9
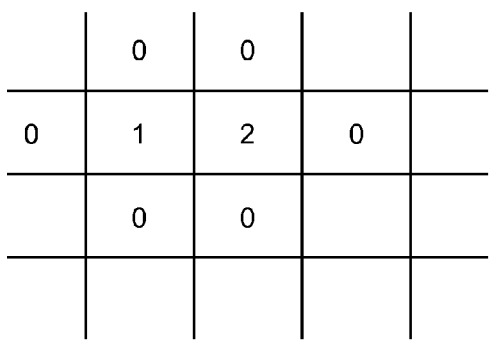
FIG. 11a
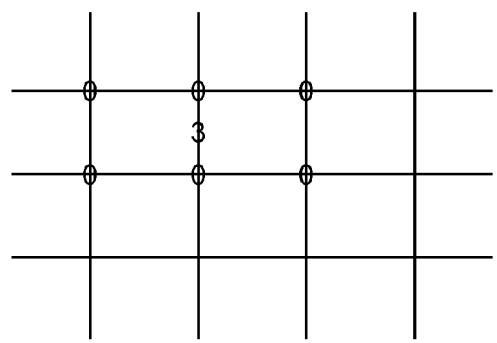
FIG. 11b
FIG. 13
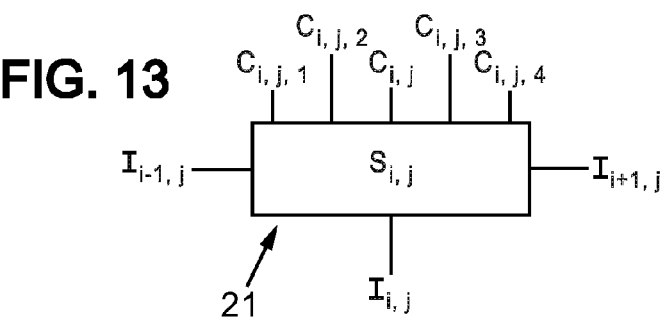

PIXILATED RADIATION SENSING DEVICE

The present application is a National Phase entry of PCT Application No. PCT/EP2009/060115, filed Aug. 4, 2009, the disclosure of which is hereby incorporated by reference herein in its entirety.

1. Field of the Invention

The instant invention relates to radiation sensing devices.

2. Background of the Invention

In imaging systems, for example X-ray imaging systems, the sensor device comprises an array of sensing areas, to sense a photon impact. The impact of a photon causes a variation of a physical magnitude, for instance the charge or the voltage of an electrical signal in a sensing area. In single photon counting sensing devices, each impinging photon is counted and allocated to the area on which it impacted.

However, for sensing devices with high resolution, for example when the pixel pitch is similar to or smaller than the sensor device thickness, the energy deposited by the impinging photon can be shared by a plurality of sensing areas. Consequently, the variation of physical magnitude of each of these sensing areas may not be representative of the energy of the impinging photon. This need to account for charge sharing was solved in WO 2007/038,974, which is hereby incorporated by reference in its entirety for all purposes.

This known device provides a more accurate energy resolution in case of radiations impinging on a plurality of pixels. Yet, there is still a need to improve this device, in particular to take into account radiations which are shared by very few pixels, or are even not shared at all.

SUMMARY OF THE INVENTION

To this aim, it is provided a radiation sensing device according to claim 1.

With these features, the result of the detection can be allocated to a specific counter of the pixel, according to whether and how the radiation is shared by more than one pixel.

In some embodiments, one might also use one or more of the features defined in the dependent claims.

BRIEF DESCRIPTION OF THE DRAWINGS

Other characteristics and advantages of the invention will readily appear from the following description of seven of its embodiments, provided as a non-limitative examples, and of the accompanying drawings.

On the drawings:

FIGS. 5a and 5b are illustrative views of operation of the first embodiment in a first scenario, FIGS. 6a to 6c are similar views for a second scenario, FIG. 9 is a view similar to FIG. 2 for a third embodiment, FIGS. 11a and 11b are illustrative views of operation of the third embodiment according to a third scenario, FIG. 13 is a partial view similar to FIG. 4 for the sixth embodiment.

On the different Figures, the same reference signs designate like or similar elements.

DETAILED DESCRIPTION

Figure 1:
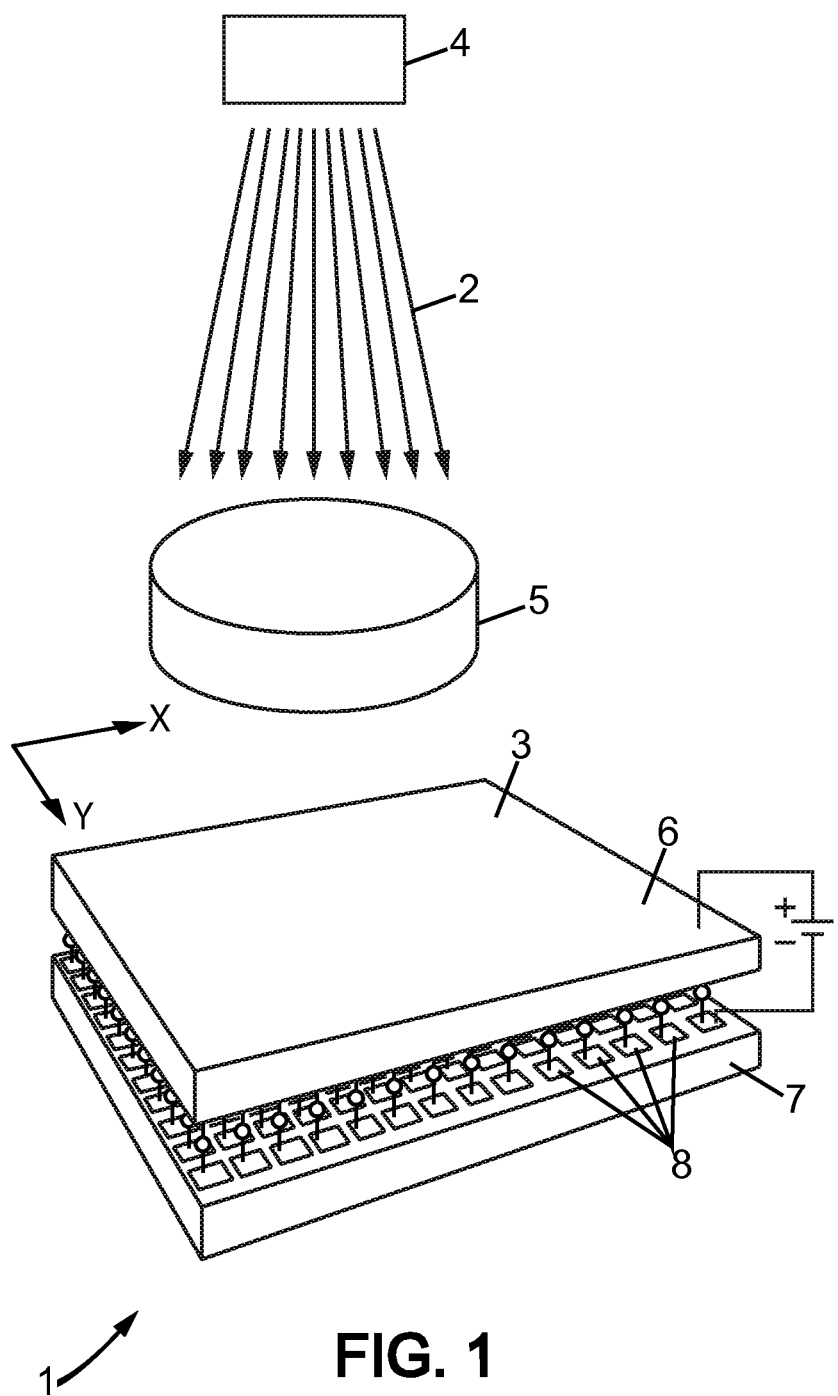
FIG. 1 is a schematic perspective view of a radiation sensing experiment.

FIG. 1 schematically shows a radiation sensing device 1 receiving an incident radiation 2 on an entry surface 3. For example, the sensed radiations are X rays. However, other kinds of radiations could be sensed with a radiation sensing device as described below, such as, for example :gamma ($\gamma$)-rays, electrons, alpha ($\alpha$)-particles, charged particles of low or high energy, ions, neutrons (both using a convertor material such as Boron), visible light (by means of amplifying a photo-electron charge using a medium such as MCP or ADP), charge-deposited in a gas detector and amplified by some gas grain grid, ... Such radiations could for example be emitted toward the radiation sensing device by a radiation emitting device 4 and, where appropriate, through an object 5 which scatters or absorbs part of such radiations. A typical example is X-ray imaging of a body for example human or animal body. Other applications are possible, which do not use an emitting device, such as detection of cosmic radiations, or the like.

The radiation sensing device 1 comprises a conversion part 6 which is able to convert the impinging radiation into a more easily detectable signal, such as an electrical signal. Such conversion parts can for example be constituted of a semiconductor material appropriate for the radiation to be detected, or a suitable gas, for example. Such conversation can be direct, or indirect, including a first conversion of the impinging radiation into another kind of radiation, such as, for example, light, and then conversion of the light into an electrical signal.

The radiation sensing device 1 further comprises a processing part 7, such as an electronic circuit, which is located right beneath the conversion part (following the direction of emission of the radiation, and can be for example, arranged as a planar array of N*M pixels (at least 3*3 pixels) 8 which are, for example, regularly arranged along two directions x and y along which they are respectively referred to by a respective index i and j.

Each pixel 8 has a polygonal surface such as, in the present example, a square or rectangular surface such as shown on FIG. 1. However, other geometries are possible than squares or rectangles, such as triangles or hexagons, ... In the following description, examples will be provided with the square geometry. However, the invention is not limited to this geometry of pixels.

Figure 2:
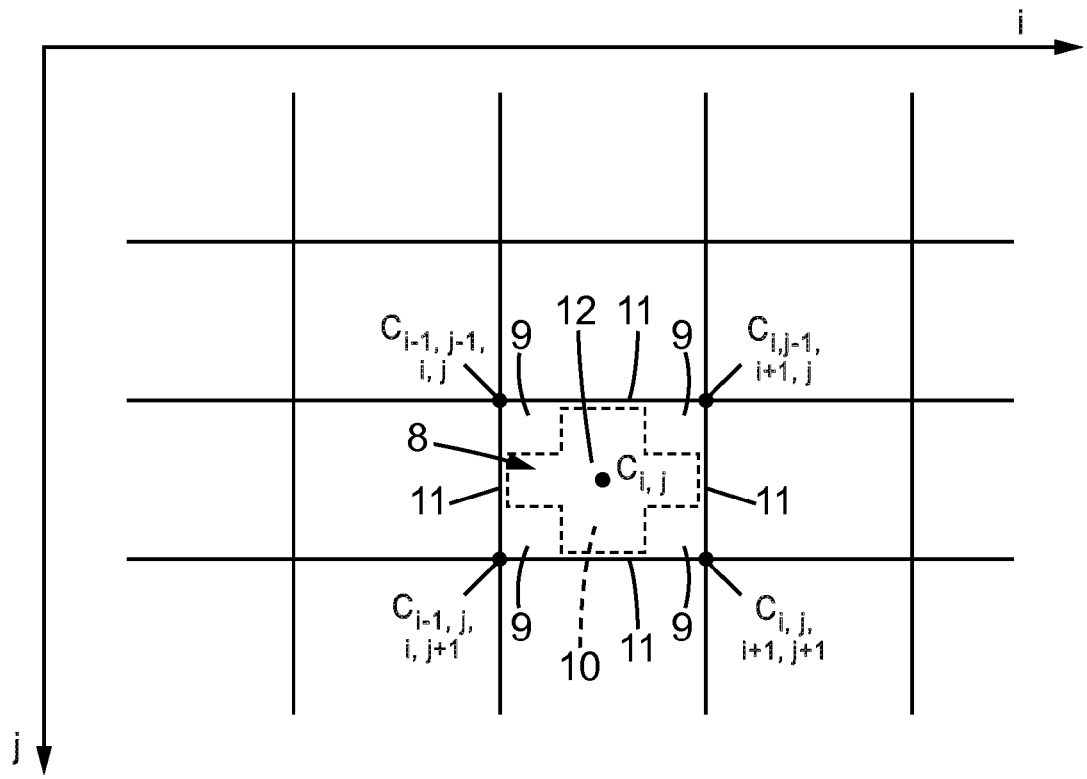
FIG. 2 is a planar partial view of a sensing device according to a first embodiment.

As shown below, on FIG. 2, a pixel 8 has n corner regions 9 (with in the present case, n=4), and a central region 10. The central region 10 is arbitrarily delimited by the dotted line on FIG. 2. It comprises all the part of the pixel, which is not in the corner regions 9. Further, the central region 10 has a centre 12, which approximately, is the centre of the pixel. According to the first embodiment, as shown on FIG. 2, the electronic part comprises for each pixel five counters:

counter $C_{i-1,j-1;i,j}$ associated to the top left corner of FIG. 2, counter $C_{i,j-1;i+1,j}$ associated to the top right corner of FIG. 2, counter $C_{i-1,j,i,j+1}$ associated to the bottom left counter of FIG. 2, counter $C_{i,j,i+1,j+1}$ associated to the bottom right corner of FIG. 2, and counter $C_{i,j}$ associated to the central region.

For example, in the first embodiment $C_{i,j}$ is associated to the centre 12 of the central region 10 of the pixel 8.

Hence, each of these counters is associated to a different region of the pixel. One is associated to a centre region, and n are associated to a respective corner region. By "different regions", it is meant that one region will not fully overlap another one, and even not overlap another one at all. For example, as described here by dotted lines, adjacent regions share a common border.

It should be mentioned that, although the four counters are associated to corner regions 9 of the considered pixel (i,j), each of these counters are also associated to the respective other three pixels which, together with the pixel (i,j) form a region of which this counter is the centre. As, in the present example, each counter associated to a corner region 9 of the pixel (i,j) is in fact shared by four pixels.

Thus, the total number of pixels is N*M, thereby defining (N+1)*(M+1) lines. The total number of counters is N*M(for the $C_{i,j}$ counters)+(N+1)*(M+1)(for the corner counters).

Hence, the surface density of counters is greater than twice the density of pixels. The mesh of pixels is coarser than the mesh of counters. The pattern of counters is repetitive, but is different from the repetitive pattern of pixels.

It could alternately be provided that the last line N+1 and/or the last column M+1 have no allocated counters, in which case the ratio of counters to pixels is 2.

Figure 3:
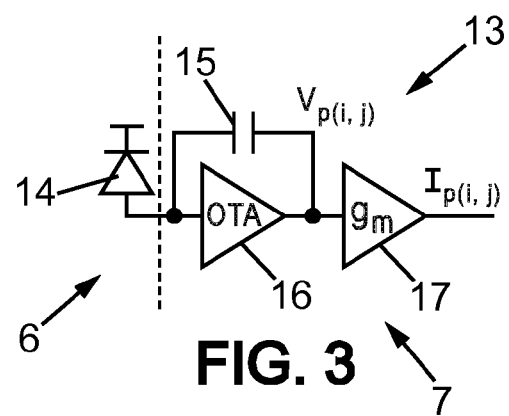
FIG. 3 is an electric diagram of an example of an electronic detection circuit.

As shown on FIG. 3, for each pixel, an electronic detection circuit 13 may be formed. This detection circuit comprises, for instance, a photo-diode 14 (part of the conversion part 6) which changes the light corresponding to the radiation received by said pixel into an electric current. The electric current may load a capacitance 15, which is connected in parallel to an operational transconductance amplifier (OTA) 16. The OTA 16 allows the current resulting from the particle impact on the photo-diode to be integrated on the capacitance 15 producing a voltage $Vp_{(i,j)}$ which is proportional to the total charge deposited by the incoming particle in the single photo-diode. This voltage is then transformed into a current $Ip_{(i,j)}$ by a transconductance stage $g_m$ 17.

Hence, this detection circuit 13 provides a signal which is representative of the energy transmitted by the impact in the considered pixel (i,j).

According to other embodiments, other kinds of circuit could be provided, which give a signal related to the energy of the part of the radiation impinging on the considered pixel.

Figure 4:
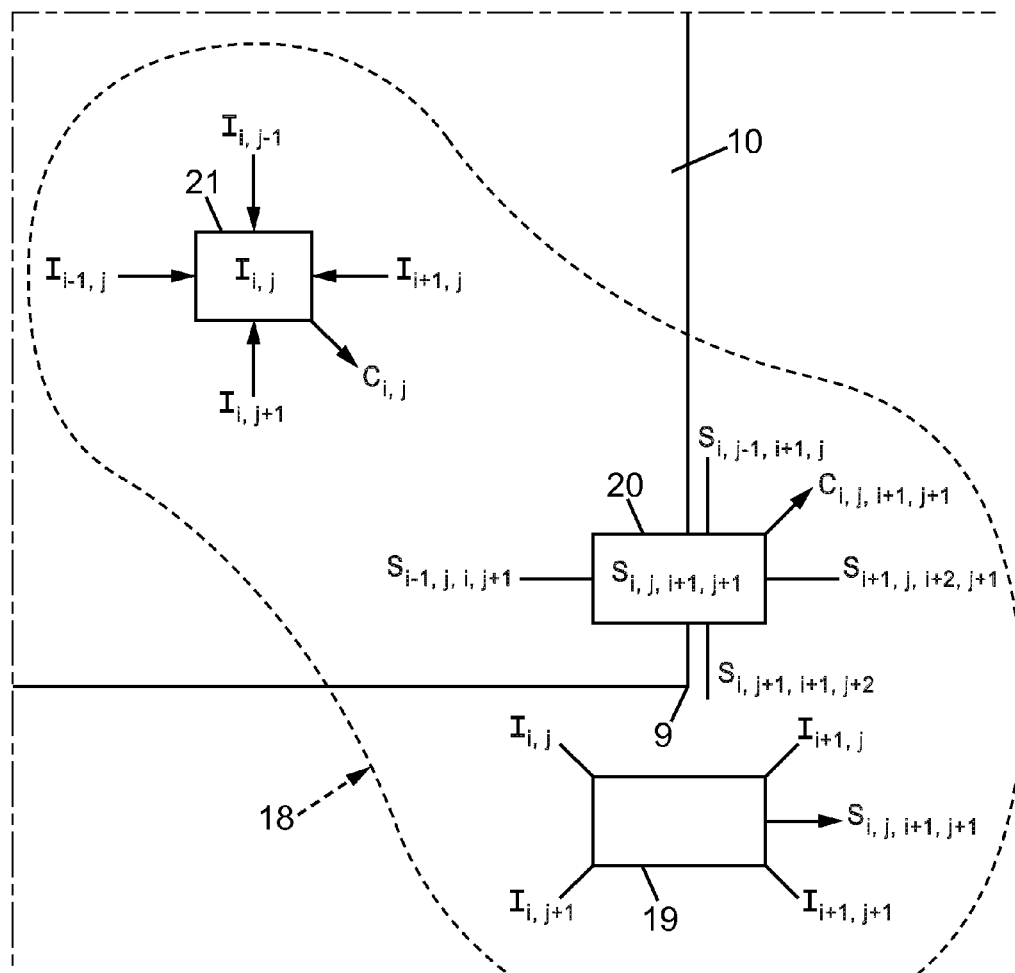
FIG. 4 is a partial planar view of a pixel according to the first embodiment.

Turning now to FIG. 4, the processing part 7 of the radiation sensing device has an arbitration circuit, a part of which is schematically shown in dotted lines 18. The arbitration circuit is able to elect a counter and to allocate a detection value to the elected counter.

The arbitration circuit is adapted to decide among the plurality of counters of the processing part which one is most suitable to be allocated a detection value corresponding to an impinging impact.

In particular, the elected counter can be the one associated to a region which is closest to (for example comprises) a barycentre of the received radiation. Hence, the elected counter can be determined by having an arbitration circuit performing barycentre calculations using as weighing factors the detection values of the respective pixels.

In order to select a counter, the arbitration circuit has to take into account detection information obtained from pixels neighbouring the pixel (i,j) to determine:

whether the impinging radiation is shared by a large quantity of pixels (for example two to four pixels), in which case the detection value will be allocated to the counter associated to the corner region 9 which is at the centre of the four impacted pixels, or, if detection is sensed in fewer pixels (for example 1 pixel), to allocate the detection value to a counter associated to the central region 10 of the pixel.

According to a first embodiment, shown in FIG. 4, the arbitration circuit 18 comprises at each corner region 9, a summing circuit 19 and a comparison circuit 20.

Further, the pixel comprises, for example in the centre region, a discriminating circuit 21.

The discriminating circuit 21 receives, as input, the signal associated to the current pixel $I_{i,j}$ as well as the signals from the closest neighbours, namely, in the present case, signals $I_{i-1,j}, I_{i,j-1}, I_{i+1,j}$ and $I_{i,j+1}$.

The discriminating circuit 21 compares the value of the signal $I_{i,j}$ to a predetermined threshold, to determine whether detection occurred in this pixel. If the result of this comparison is that detection occurred in this pixel, the discriminating circuit determines if detection also occurred in any of the four neighbouring pixels. For example, the discriminating circuit 21 compares the value of the four received signals with the same threshold, or with the value of $I_{i,j}$.

Alternatively, two different circuits could perform each one of these steps. Alternatively, occurrence of the detection could be performed locally at each of the neighbouring pixels, and the signal received as input to the discriminating circuit 21 for the pixel (i,j) is only a bit coding for the fact that detection occurred or not in the considered neighbour pixel.

If the discriminating circuit determines that no detection occurred in any of the neighbouring pixels, it elects, as elected counter, the counter $C_{i,j}$ associated to the central region 10 of the pixel and allocates to this elected counter a detection value. Such detection value is for example the value of $I_{i,j}$ respective of the energy of the incoming radiation in the pixel (i,j).

Further, the discriminating circuit, in such cases, allocates a value of zero (0) to each of the counters associated to the corner regions of the considered pixel.

To the contrary, if the discriminating circuit 21 finds out that, in addition to detection occurring to the present pixel, detection also occurred to a neighbour pixel, one of the counters associated to the corner regions will be the elected counter. In such case, the discriminating circuit allocates zero (0) to the counter $C_{i,j}$ associated to the central region of the pixel.

Then, in each corner region 9, the summing circuit 19 sums the input of the four pixels closest to the given corner region.

In the example of FIG. 4, only the summing circuit 19 for the bottom right corner of the pixel (i,j) is shown but of course, similar summing circuit are present at each corner region. The summing circuit 19 receives as input:

the detection value $I_{i,j}$ of the pixel (i,j), the detection value $I_{i,j+1}$ of the pixel (i,j+1) below the pixel (i,j), the detection value of the pixel (i+1,j) to the right of the pixel (i,j), the value $I_{i+1,j+1}$ from the pixel (i+1,j+1) at the bottom right of the pixel (i,j), and and outputs $S_{i,j,i+1,j+1}$ the sum of these four values.

The comparison circuit 20 is able to determine whether the corner region where it is located must have its counter elected.

In the present case, the counter of a given corner region will be elected when the sum calculated by the summing circuit 19 at this corner will be greater than the sum of the four neighbouring corner counters.

Hence, the comparison circuit 20 receives, as inputs:

$S_{i,j;i+1,j+1}$, the sum calculated for the present corner region, $S_{i-1,j;i,j+1}$, the sum calculated for the corner region at the left of the present corner region, $S_{i,j-1;i+1,j}$ the sum calculated for the corner region at the top of the given corner region, $S_{i+1,j;i+2,j+1}$ the sum calculated for the corner region to the right of the present corner region, and $S_{i,j+1;i+1,j+2}$ the sum calculated for the corner to the bottom of the present corner region.

If $S_{i,j;i+1,j+1}$ is greater than the other four inputs, the counter $C_{i,j;i+1,j+1}$ is elected.

Further, a detection value of the detection is allocated to said counter. For example, the allocated detection value is the sum $S_{i,j;i+1,j+1}$. If $C_{i,j;i+1,j+1}$ is not elected, zero (0) is allocated to this counter. Then, the value of the elected counter is sent to or read by a remote processing unit, and then reset. The value of the other counters is not read. Such reading can be performed on an event-by-event basis.

The circuit which has just been described enables to take into account both events shared by a plurality of pixels, and events detected by a single pixel.

If an event is detected by a single pixel, it will be allocated to the counter associated to the central region. If an event is detected by a plurality of pixels, it will be allocated to the counter associated to the most relevant corner of the pixel.

Compared with an hypothetical embodiment, where there is no discriminating circuit 21, in cases where an event is detected by a single pixel, in such hypothetical comparative example, the sums calculated by each four summing circuits 19 would be approximately equal, being different only because of the electronic noise. In such comparative example, the detection would be randomly allocated to the one corner with the biggest noise error. Hence, according to the present invention, the present problem of the comparative example is solved.

This is illustrated on FIGS. 5a, 5b, 6a, 6b, 6c below.

Figures 5A, 5B, 6A, 6B, 6C:
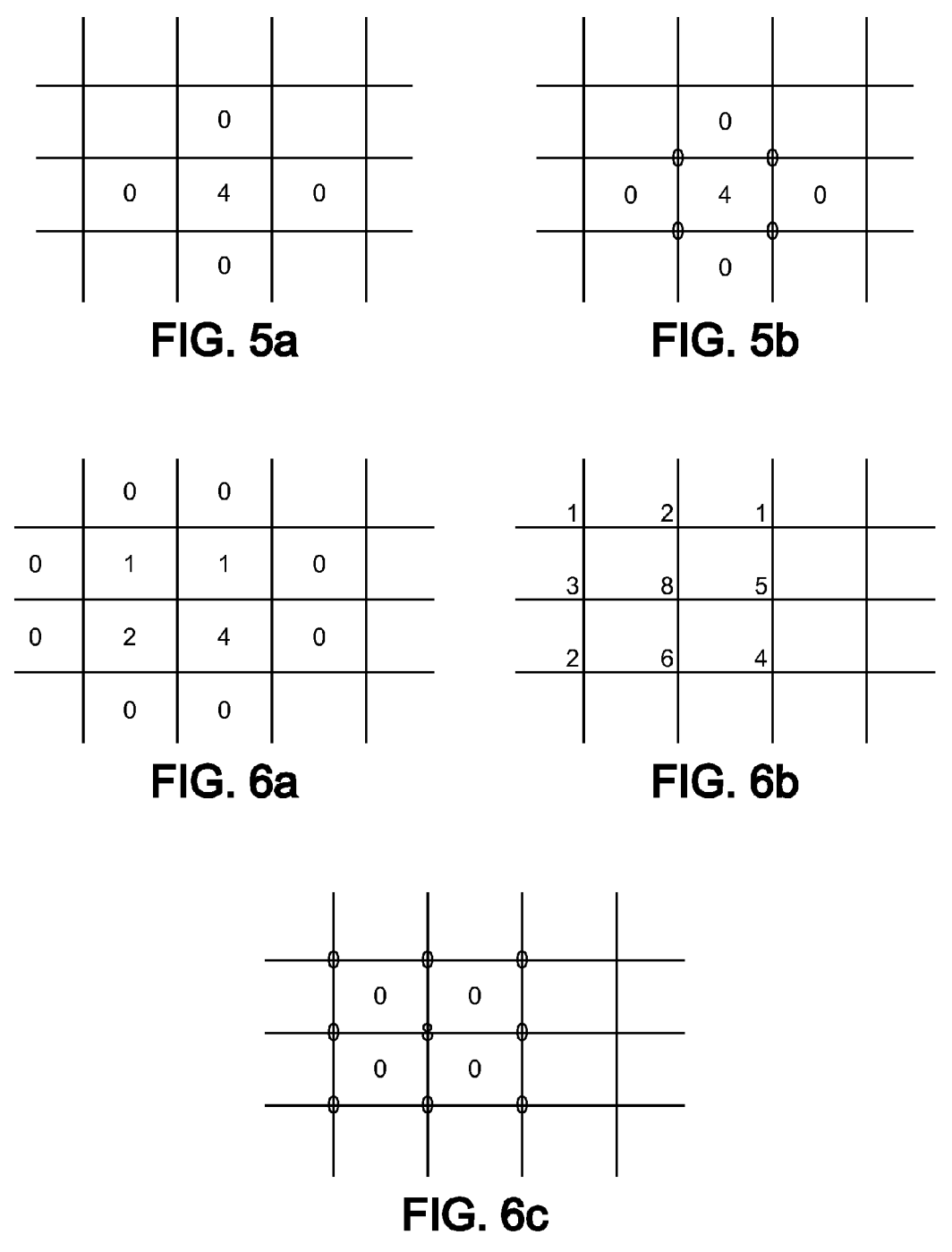

FIG. 5a schematically shows the case of a first scenario where detection occurs in only one pixel, with a detection value of 4.

As shown on FIG. 5b, the discriminating circuit 21 enables to determine that detection occurred only in this pixel, and allocates the detection value to the counter associated to the central region.

Zero is allocated to the other counters.

FIG. 6a now shows a case where a single particle is detected by four neighbour pixels, with detection values 1, 1, 2 and 4 respectively.

For each pixel, the discriminating circuit 21 determines that at least one neighbour pixel was hit and hence allocates zero to the counter associated with the central region. Then the process is handed over to the summing circuit, which, for each corner region, performs the sums of the neighbour pixels, the results of which are shown on FIG. 6b.

The process continuous with application of the comparison circuit, which is able to determine that the elected counter will be the central counter, and that the detection value of eight will be associated thereto. The other corner counters receive a zero value.

Figure 7:
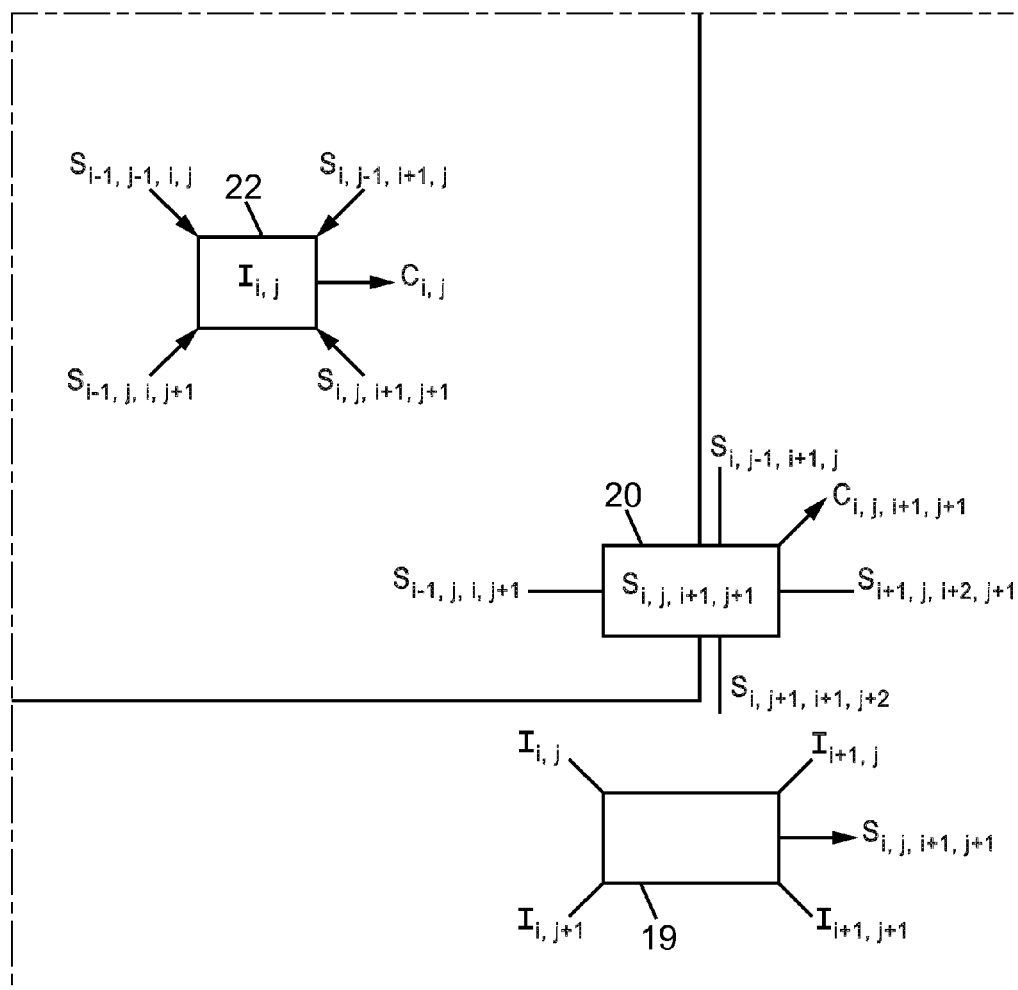
FIG. 7 is a view similar to FIG. 4 for a second embodiment.

FIG. 7 now shows a second embodiment for the present invention. According to this second embodiment, the summing circuit 19 and comparison circuit 20 are similar to the ones described above for the first embodiment. However, the summing circuits 19 are not connected to the output of the discriminating circuit 21, but a discriminating circuit 22 is branched as the output of the summing circuits 19.

According to this second embodiment, the summing circuits 19 start by performing a sum, as explained above in the first embodiment.

The discriminating circuit 22 is allocated to a pixel, for example at the centre of the pixel, and receives as inputs:

$S_{i-1,j-1;i,j}$, the sum obtained for the top left corner region, $S_{i,j-1;i+1,j}$ the sum obtained for the top right corner region, $S_{i-1,j;i,j+1}$, the sum for the bottom left corner region, and $S_{i,j;i+1,j+1}$, the sum for the bottom right corner region.

According to the second embodiment, the discriminating circuit 22 compares the four input signals and checks whether these signals are all substantially equal (the difference between the minimum and the maximum of these four signals being less than a predetermined threshold).

If the discriminating circuit 22 determines that the four inputs are substantially equal, it elects the counter $C_{i,j}$ of the central region as the elected counter. Further, it allocates to the elected counter a detection value such as, for example, $I_{i,j}$. Further, it can also allocate a detection value of zero (0) to the counters associated to the corner regions.

To the contrary, if the discriminating circuit 22 determines that at least two of the four input are substantially different, it allocates zero to the counter $C_{i,j}$ associated to the central region. In such cases, one of the corners associated to a corner region will be the elected counter. Determination of the elected counter is performed by the comparison circuit 20 as in the first embodiment.

Figure 8A:
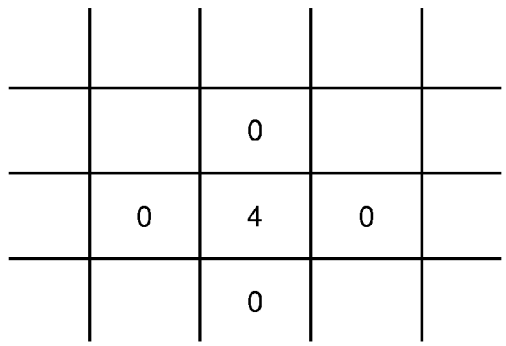
FIGS. 8a to 8c are illustrative views of operation of the sensing device of the second embodiment in the first scenario.
Figure 8B:
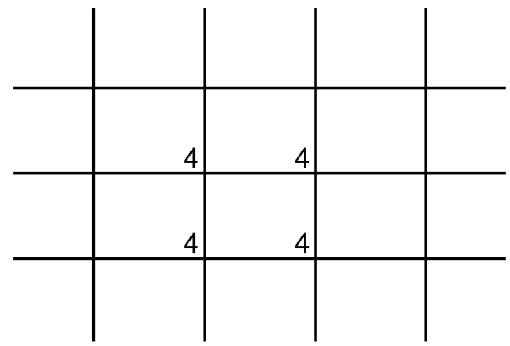
Figure 8C:
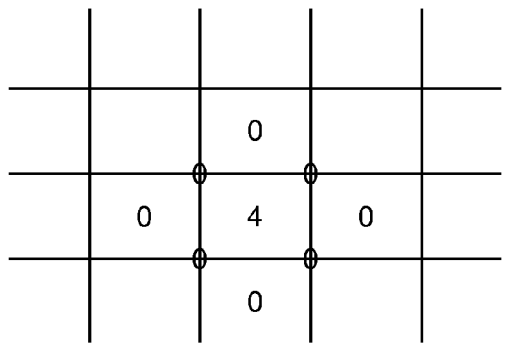

An example is illustrated schematically on FIGS. 8a to 8c. In this example, as shown on FIG. 8a, an event occurs only in one pixel, with a detection value of 4.

As shown on FIG. 8b, the summing circuits 19 associated to each corner region sum the inputs, so that a value of 4 is associated to each corner region of the pixel. As shown on FIG. 8c, the discriminating circuit 22 distinguishes that the values associated to each corner region are substantially equal, and elects the counter associated to the central region as the elected counter. Further, it allocates the detected value to this counter, and zero (0) to the other counters (FIG. 8c).

In case of detection shared by plurality of pixels, such as shown on FIG. 6a, the process is substantially such as described on FIGS. 6a to 6c, for the first embodiment. Namely, the sums are performed at each corner, as shown on FIG. 6b. At this stage, the discriminating circuit 22 will determine that, for each pixel, the sums calculated for each corner are different, and allocate a value of zero (0) to their respective counters associated to the central region. Then, the comparison circuit 20 will determine which one the counters associated to corner regions will be the elected counter, and associate the corresponding sum to that elected counter (FIG. 6c).

Thus, as it is apparent from the above embodiments, election of the elected counter could be performed based on the detection value of the pixels, or on suitable combinations of these detection values, where appropriate.

FIG. 9 now shows a third embodiment of the invention.

In this third embodiment, there is not necessarily a counter $C_{i,j}$ associated to the centre of the central region 10 of the pixel. However, counters can be associated to edges 11 between two neighbour corner regions 9.

As explained above, these edge counters are each associated to the central region 10, the central region 10 including any part of the pixel which is not in the corners.

For example, as shown on FIG. 9, there are four edge counters:

counter $C_{i,j-1,j}$ associated to the top of the pixel,
counter $C_{i-1,i,j}$ associated to the left of the pixel,
counter $C_{i,i+1,j}$ associated to the right of the pixel, and
counter $C_{i,j,j+1}$ associated to the bottom of the pixel.

Hence, as is the case for the counters associated to corner regions, which are each shared by four pixels, edge counters are shared by two pixels.

The regions associated to each counter are purely arbitrarily designated by dotted lines on FIG. 9.

Hence, for N*M pixels, there are (N+1)*(M+1)+2*N*M+M+N counters.

Figure 10:
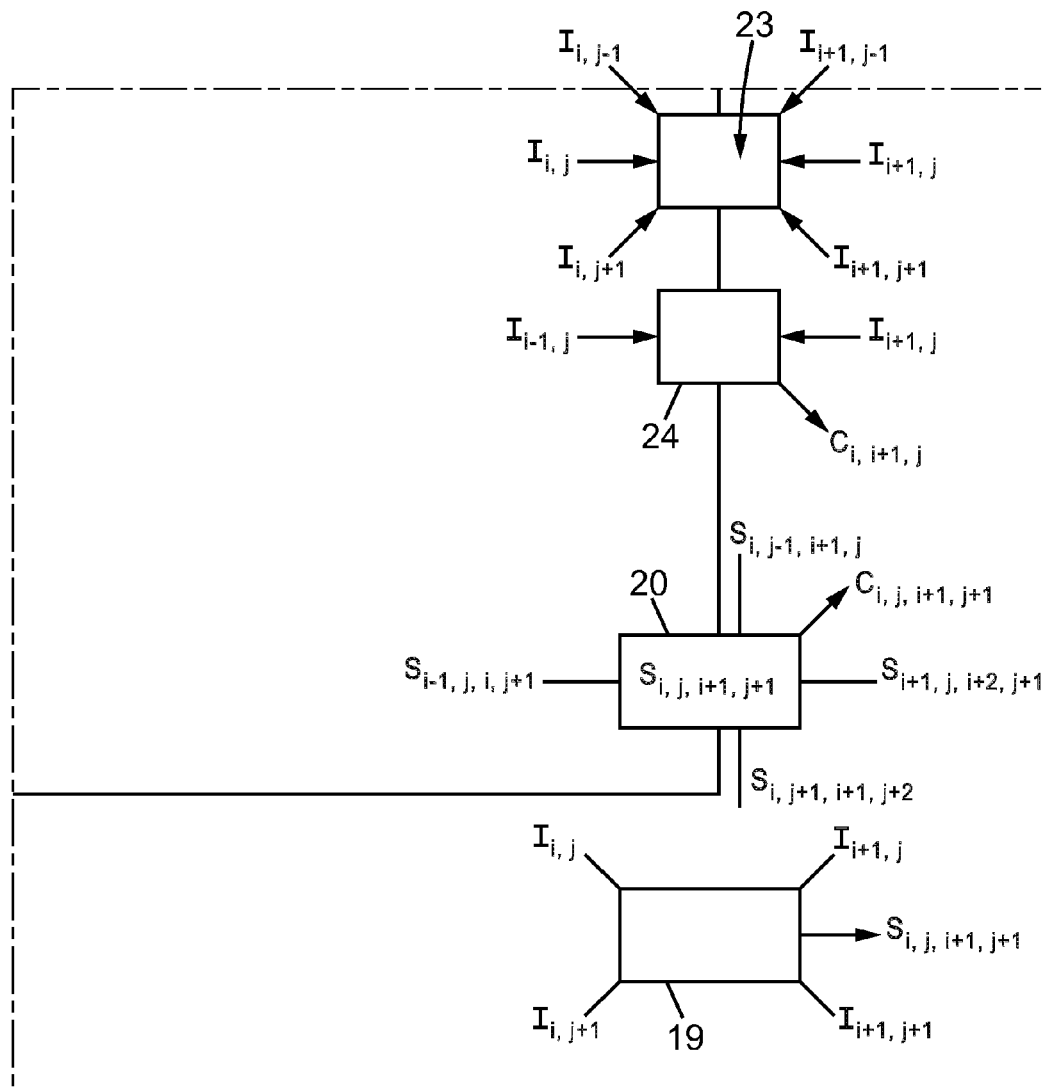
FIG. 10 is a view similar to FIG. 4 for the third embodiment.

As shown on FIG. 10, according to this embodiment, a discriminating circuit 23 is associated with each edge. The arbitration circuit further comprises an edge summing circuit 24. The arbitration circuit further comprises summing circuits 19 and comparison circuits 20 as in the first two embodiments. These two circuits will not be described in more details here.

The discriminating circuit 23 is used to determine whether detection occurred only in the two pixels which share the given edge and to elect the counter associated to this edge as the elected counter in such cases.

For example, the edge discriminating circuit 23 receives as input:
$I_{i,j}$, the detection value for the pixel (i,j), to the left of the edge,
$I_{i+1,j}$ for the pixel to the right of the edge, and
$I_{i,j-1}$, $I_{i+1,j-1}$, $I_{i,j+1}$, and $I_{i+1,j+1}$, for the two pixels above, and the two pixels below the pixels which share the given edge.

First, the edge discriminating circuit 23 will check that both the values $I_{i,j}$ and $I_{i+1,j}$ are over a predefined threshold (namely that a detection occurred in these two pixels). If this is not the case, the discriminating circuit 23 will allocate a value of zero to the given edge counter $C_{i,i+1,j}$.

If both the values $I_{i,j}$ and $I_{i+1,j}$ are substantially greater than zero, namely if a detection occurred in these two pixels, the edge discrimination circuit will check whether detection also occurred in the other four surrounding pixels. If at least one of these four neighbour values is substantially greater than zero (greater than a predefined threshold), meaning that a detection occurred also in one of these neighbour pixels, it means that the detection did not occur only around the considered edge and a value of zero is allocated to the considered edge counter $C_{i,i+1,j}$.

If the values from the four neighbour pixels are substantially zero, the edge counter $C_{i,i+1,j}$ is the elected counter.

The edge summing circuit 24 receives as input $I_{i,j}$ and $I_{i+1,j}$, the values for the two pixels which share the given edge, and provide as output a sum of these two inputs. This sum can be allocated to the elected counter $C_{i,i+1,j}$, as the detection value.

If it is decided by the edge discriminating circuits 23 that none of the edge counters is the elected counter for the current detection, the process is handed over to the summing circuits 19 and comparison circuit 20 as explained above for the first embodiment. In such cases, it means that detection occurred, but not only in two neighbour pixels. In such case, the elected counter will be the counter associated to the most relevant corner region, as explained above.

This situation is exemplified on FIGS. 11a and 11b. FIG. 11a illustrates a case where detection occurs only in two neighbour pixels, with respective detection values of 1 and 2. In such case, as explained above, the edge discriminating circuit will determine that the counter associated to the edge shared by these two pixels is the elected counter, and the edge summing circuit 24 will allocate to this counter the sum of the values detected by these two pixels. Values of zero (0) are associated to the neighbour counters, as shown on FIG. 11b.

In cases where detection occurs in more than two neighbour pixels, such as shown on FIG. 6a, the logic operates as explained above in relation to FIGS. 6a to 6c. Namely, the edge discriminating circuits 23 determines that no edge counter will be the elected counter, and a value of zero (0) is associated to these counters. Then, the summing circuit 19 and comparison circuit 20 operate as explained above (FIG. 6b, FIG. 6c).

Further, as well as the second embodiment could be obtained, from the first embodiment, by placing the discriminating circuit at the output of the summing circuits, to perform discrimination based on the results of the summing circuits, the third embodiment could also be modified into a fourth embodiment, where edge discrimination is performed, not based on the input from the pixels themselves, but from the summing circuits 19.

It will be appreciated that the embodiments of FIG. 2 and FIG. 9 can be combined in a detector having, according to a fifth embodiment, for each pixel, a counter associated to each corner region, a counter associated to each edge, and a counter associated to the centre of the central region, hence (N+1)*(M+1)+2*N*M+N+M+N*M counters. For such an embodiment:
if it is determined that a detection value is obtained for only one pixel, the counter associated to the centre will be the elected counter,
if it is determined that a detection is shared by only two neighbour pixels, the elected counter will be the counter associated to the edge shared by these two pixels, and
if it is determined that detection occurred in three or four pixels, the elected counter will be the most relevant counter associated to a corner region.

In any of these embodiments, one aim is to avoid to allocate a detection value based on electronical noise. Thus, it is provided for additional circuits enabling to, whenever electronical noise will impact on the election decision, find an alternative way to perform the counter election.

Further, it will be appreciated that, even though the present description is given for the case of detections occurring at most on four pixels, the described circuits could be connected to more remote neighbour pixels, so as to perform arbitration, and determination of the most relevant counter based on values from more than four pixels.

Another sixth embodiment is partially shown on FIG. 11.

Figure 12:
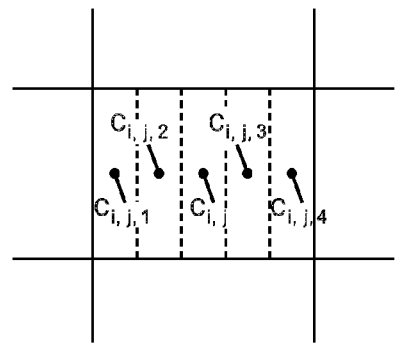
FIG. 12 is a schematic partial view of a pixel according to a sixth embodiment.

According to this embodiment, five counters are associated each to a respective region, these regions being located along a horizontal line passing through the centre of the pixel. These counters are named, from left to right, $C_{i,j,1}$, $C_{i,j,2}$, $C_{i,j}$, (which is a counter associated to the centre of the pixel), $C_{i,j,3}$ and $C_{i,j,4}$. Outermost counters $C_{i,j,1}$ and $C_{i,j,4}$ could be edge counters as described in relation to FIG. 10 or associated not to the edge, but to regions closer to the centre. For example, these five counters are evenly spaced along this longitudinal line. The regions associated to each counter are purely arbitrarily designated by dotted lines on FIG. 12.

According to this embodiment, the number of counters is a*N*M, with a equal to 5 in the present embodiment. In alternative embodiments, different values of a could be used, such as a=2 or more.

Logic enables to elect the elected counter by performing barycentric calculations on the detection values for the obtained pixels. As shown on FIG. 13, the discriminating circuit 21 can receive, as input, detection values $I_{i-1,j}$, $I_{i,j}$, and $I_{i+1,j}$, and have five outputs, each corresponding to a given counter. The elected counter could be chosen for example by comparing the lengths of the pulses coming from the discriminators associated with $I_{i-1,j}$, $I_{i,j}$, and $I_{i+1,j}$, i.e. the time-over-threshold value. Hence, the discriminating circuit 21 is able to provide an output proportional to the respective ratios of the input amplitudes.

Figure 14A:
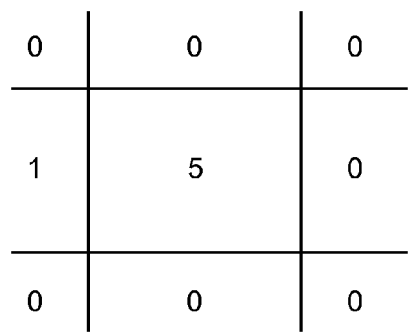
FIGS. 14a and 14b are illustrative views of operation of a sensing device according to the sixth embodiment, in the third scenario.
Figure 14B:
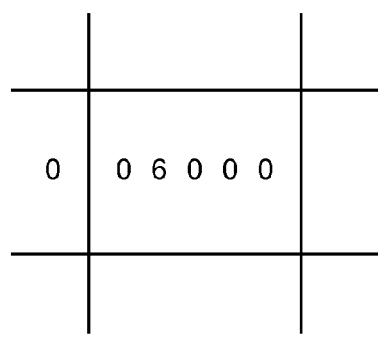

A typical example is shown on FIGS. 14a and 14b. On FIG. 14a, only two pixels provide a non-zero detection value, respectively of 1 and 5. Hence, the discriminating circuit enables to determine that the elected counter, being the one associated to the region closest to the centre of the impinging radiation, will in the present case, be $C_{i,j,2}$. Further, the sum of the detected detection values can be allocated to the elected counter. Zero (0) is allocated to the other counters. This is shown on FIG. 14b.

It will be readily appreciated that many variants of this embodiment are possible within the scope of the invention. Each given pixel might comprise b such lines of counters (for example b chosen between 2 and 10), evenly spaced along the vertical direction, or not. Such embodiments might not need any counters associated to corner regions. Thus, arrays of counters could be almost totally uncoupled from arrays of pixel sensing areas.

In general rule, the purpose of the invention is to provide a mesh of counters finer than the mesh of pixels (sensing area conversion units), and to have logic to determine to which of the counters the hit should be allocated, based on the detection value for a given pixel and its neighbouring pixels. The mesh of counters might not be regular, or at least not uniform. The spatial resolution will thus be increased whereas the energy resolution can be kept high.

As a general remark regarding all of the above embodiments, it should be noted that, although it was described that the summation value would be allocated to the elected counter, in other possible embodiments, it could simply be a value of one (1) which is associated to the elected counter.

All counters described above are associated to regions which are physically separate from one another. In variant embodiments, some or each counters could be replaced by a plurality of counters each provided with one given energy window, for example so as to be able to register different energy levels (or bins) for a given location in the pixel.

It should be noted that it could be provided that the radiation sensing device operates in a fine resolution mode, for example as described for any of the previous embodiments, and that a further coarser operative mode be provided, where pixels are combined to provide super-pixels. For example, at the coarser level, another coarser arrangement of counters is provided. These could be different counters, or a selection among counters of the finer level. For example, in the coarser mode, pixels are combined B by C, for example 2 by 2, 3 by 4, . . . with $2 \leq B \leq n$ and $2 \leq C \leq M$. If $B \leq N/2$ and $C \leq M/2$, electronics can be provided at the super-pixel level as well, according to any of the above embodiments. This would allow for example to watch different energy windows having different thresholds.

Further, it will be appreciated by the person skilled in the art, that the present description is given for most of the pixels of the radiation sensing device. However, special implementation could be provided for some specific pixels such as, for example, those pixels which are along the edge of the sensing device, or events in the corner of the sensing device (having less neighbour pixels than the main part of the sensing device).

The invention claimed is:

1. A radiation sensing device subdivided in N*M pixels, with both N and M at least equal to 3, each pixel having a polygonal surface, wherein the radiation sensing device comprises:

a conversion part, adapted to convert, for each pixel, an impinging radiation into an electrical signal having an attribute, a value of said attribute being related to an energy of said impinging radiation for the pixel, a processing part having:

for each pixel, at least two counters each associated to a different region of the pixel, a ratio between a total number of counters of the radiation sensing device and a total number of pixels of the radiation sensing device being at least 2, an arbitration circuit adapted, for each pixel:

to receive detection information from said pixel and neighbouring pixels, to determine whether detection should be allocated to an elected one of said plurality of counters, taking into account detection information for said pixel and detection information from neighbouring pixels and, in such case, to allocate a detection value to said elected counter.

2. Radiation sensing device according to claim 1, wherein the arbitration circuit is adapted to determine, as the elected counter, the counter which is associated to a region closest to a barycentre of said pixel and neighbouring pixels using, as weighing factors, the detection information for the respective pixels.

3. Radiation sensing device according to claim 1, wherein each polygonal surface has n corner regions, and wherein the processing part has, for each pixel, at least n+1 counters, a counter being associated to each respective corner region.

4. Radiation sensing device according to claim 3, wherein each polygonal surface has a centre region, and wherein, for each pixel, a counter is associated to the centre region.

5. Radiation sensing device according to claim 4, wherein each pixel has a centre, and wherein a counter is associated to said centre.

6. Radiation sensing device according to claim 1, wherein each polygonal surface has n corner regions, wherein each pixel has one edge joining two corners, and wherein a counter is associated to said edge.

7. Radiation sensing device according to claim 6 wherein, for each given pixel, the arbitration circuit is adapted to receive detection information from k neighbouring pixels, with k at least equal to n, and, when detection information from said given pixel is over a predetermined threshold, and when detection information from only one of said k neighbouring pixels is over a predetermined threshold, to allocate a detection value to a counter associated to an edge.

8. A radiation sensing device according to claim 6, wherein a counter is associated to each edge.

9. Radiation sensing device according to claim 1 wherein each polygonal surface has n corner regions and a central region, and wherein, for each given pixel, the arbitration circuit is adapted to receive detection information from k neighbouring pixels, with k at least equal to n, and, when detection information from said given pixel is over a predetermined threshold, and when detection information from none of said k neighbouring pixels is over a predetermined threshold, to allocate a detection value to a counter associated to the central region.

10. Radiation sensing device according to claim 1 wherein each polygonal surface has n corner regions and a central region, and wherein, for each given pixel, the arbitration circuit is adapted to receive detection information from k neighbouring pixels, with k at least equal to n, and, when detection information from said given pixel is over a predetermined threshold, and when detection information from two or three of said k neighbouring pixels is over a predetermined threshold, to allocate a detection value to a counter associated to a corner region.

11. Radiation sensing device according to claim 1, wherein each polygonal surface has n corner regions, and wherein the processing part further comprises, for each pixel, a summing circuit adapted to sum the detection information from neighbouring pixels, and to output said sum as said detection value.

12. Radiation sensing device according to claim 11 wherein the arbitration circuit further comprises, for each corner region, a comparison circuit, adapted to receive detection values associated to neighbour corner regions, to compare said detection values with the detection value associated to the given corner region, and to allocate the detection value to the counter associated to the given corner region only if it is greater than the detection values associated to all neighbour corner regions.

13. A radiation sensing device according to claim 11, wherein a summing circuit is provided for each corner region.

14. Radiation sensing device according to claim 1 wherein each polygonal surface has n corner regions and a central region, and wherein, for each given pixel, the arbitration circuit is adapted to receive detection information from k neighbouring pixels, and to associate a detection value to a corner region,
wherein the arbitration circuit further comprises, for each pixel, a comparison circuit, adapted to receive detection values associated to its corner regions, to compare said detection values with one another, and to allocate the detection value to the counter allocated to the central region, if the difference between the detection values allocated to said corner regions is below a predetermined threshold.

15. Radiation sensing device according to claim 1, wherein said ratio is greater 3; preferably greater than 4, even more preferably greater than 5.

16. Radiation sensing device according to claim 1, wherein the conversion part has a repetitive pattern, and wherein the counters are associated to regions arranged along a repetitive different pattern.

17. Radiation sensing device according to claim 1, further comprising a coarse arbitration circuit adapted, for each group of at least 2 pixels:
  to receive detection information from said group of pixels and neighbouring groups of pixels,
  to determine whether detection should be allocated to an elected one of said plurality of counters, taking into account detection information for said group of pixels and detection information from neighbouring groups pixels and, in such case, to allocate a detection value to said elected counter.

18. A radiation sensing device subdivided in N*M pixels, with both N and M at least equal to 3, each pixel having a polygonal surface having n corner regions, wherein the radiation sensing device comprises:
  a conversion part, adapted to convert, for each pixel, an impinging radiation into an electrical signal having an attribute, a value of said attribute being related to an energy of said impinging radiation for the pixel,
  a processing part having:
    for each pixel, at least two counters each associated to a different region of the pixel, a ratio between a total number of counters of the radiation sensing device and a total number of pixels of the radiation sensing device being at least 2,
  for each pixel, a summing circuit adapted to sum the detection information from neighbouring pixels, and to output said sum as said detection value,
    an arbitration circuit adapted, for each pixel:
      to receive detection information from said pixel and neighbouring pixels,
      to determine whether detection should be allocated to an elected one of said plurality of counters, taking into account detection information for said pixel and detection information from neighbouring pixels and, in such case, to allocate a detection value to said elected counter,
    wherein the arbitration circuit further comprises, for each corner region, a comparison circuit, adapted to receive detection values associated to neighbour corner regions, to compare said detection values with the detection value associated to the given corner region, and to allocate the detection value to the counter associated to the given corner region only if it is greater than the detection values associated to all neighbour corner regions.

19. A radiation sensing device according to claim 18, wherein said summing circuit is provided for each corner region.

20. A radiation sensing device subdivided in N*M pixels, with both N and M at least equal to 3, each pixel having a polygonal surface with n corner regions and a central region, wherein the radiation sensing device comprises:
  a conversion part, adapted to convert, for each pixel, an impinging radiation into an electrical signal having an attribute, a value of said attribute being related to an energy of said impinging radiation for the pixel,
  a processing part having:
    for each pixel, at least two counters each associated to a different region of the pixel, a ratio between a total number of counters of the radiation sensing device and a total number of pixels of the radiation sensing device being at least 2,
    an arbitration circuit adapted, for each pixel:
      to receive detection information from said pixel and k neighbouring pixels, and to associate a detection value to a corner region,
      to determine whether detection should be allocated to an elected one of said plurality of counters, taking into account detection information for said pixel and detection information from neighbouring pixels and, in such case, to allocate a detection value to said elected counter, wherein the arbitration circuit further comprises, for each pixel, a comparison circuit, adapted to receive detection values associated to its corner regions, to compare said detection values with one another, and to allocate the detection value to the counter allocated to the central region, if the difference between the detection values allocated to said corner regions is below a predetermined threshold.

* * * * *